US012574789B2

(12) United States Patent
Yamaoka et al.

(10) Patent No.: US 12,574,789 B2
(45) Date of Patent: Mar. 10, 2026

(54) WIRELESS COMMUNICATION CONTROL DEVICE, WIRELESS COMMUNICATION DEVICE, AND WIRELESS COMMUNICATION CONTROL METHOD CAPABLE OF REDUCING WASTEFUL COMMUNICATION WHILE PREVENTING CONCENTRATION OF CONNECTIONS ON SAME ACCESS POINT OF WIRELESS NETWORK

(71) Applicant: DENSO CORPORATION, Kariya-city (JP)

(72) Inventors: Kousuke Yamaoka, Kariya-city (JP); Ryuichi Arai, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 398 days.

(21) Appl. No.: 18/191,537

(22) Filed: Mar. 28, 2023

(65) Prior Publication Data

US 2023/0239722 A1 Jul. 27, 2023

Related U.S. Application Data

(63) Continuation of application No. PCT/JP2021/033085, filed on Sep. 9, 2021.

(30) Foreign Application Priority Data

Oct. 13, 2020 (JP) ................................. 2020-172814

(51) Int. Cl.
*H04W 28/02* (2009.01)
*H04W 48/16* (2009.01)
(Continued)

(52) U.S. Cl.
CPC ....... *H04W 28/0226* (2013.01); *H04W 48/16* (2013.01); *H04W 48/20* (2013.01); *H04W 64/006* (2013.01)

(58) Field of Classification Search
CPC . H04W 28/0226; H04W 48/16; H04W 48/20; H04W 64/006; H04W 36/00835;
(Continued)

(56) References Cited

U.S. PATENT DOCUMENTS

| | | | | |
|---|---|---|---|---|
| 2015/0319668 | A1 | 11/2015 | Guo | |
| 2019/0215378 | A1* | 7/2019 | Munishwar | ......... H04W 36/322 |
| 2021/0022046 | A1* | 1/2021 | Wang | ..................... H04W 4/42 |

FOREIGN PATENT DOCUMENTS

| | | | |
|---|---|---|---|
| JP | 2006262176 A | | 9/2006 |
| JP | 2009206621 A | * | 9/2009 |

(Continued)

*Primary Examiner* — Michael Y Mapa
(74) *Attorney, Agent, or Firm* — Harness, Dickey & Pierce, P.L.C.

(57) ABSTRACT

By a wireless communication control device, a wireless communication device, a wireless communication control method, a predicted travel route of a vehicle is identified, access point information for identifying a position of an access point and a communication range is acquired. estimation information for estimating a transit time in a section on the identified travel route is acquired, a transit time required for the vehicle to pass through a communication range of the access point connectable to the wireless communication device on the identified travel route is estimated, and the access point causing the estimated transit time to be equal to or higher than a threshold is determined.

10 Claims, 6 Drawing Sheets

(51) Int. Cl.
    *H04W 48/20*            (2009.01)
    *H04W 64/00*            (2009.01)
(58) Field of Classification Search
    CPC ........... H04W 36/00838; H04W 36/22; H04W
                                36/324; H04W 84/12
    USPC  .... 370/329, 331; 455/99, 152.1, 238.1, 297,
                      455/345, 435.1–444, 569.2, 575.9
    See application file for complete search history.

(56)                  References Cited

FOREIGN PATENT DOCUMENTS

JP        2017063494  A      3/2017
WO    WO-2014103080  A1      7/2014

* cited by examiner

FIG. 2

START

S1 — ACCESS APS 2

S2 — UPDATE DATA THERE? — NO

YES

S3 — ACQUIRE AP INFORMATION

S4 — STORE IN APDB 571

END

START

S21 — IDENTIFY PREDICTION TRAVEL ROUTE

S22 — ACQUIRE ESTIMATION INFORMATION

S23 — ESTIMATE TRAVEL SPEED

S24 — SEARCH AP INFORMATION

S25 — ESTIMATE TRANSIT TIME

S26 — DO RESERVATION NOTIFICATION

S27 — STORE CONNECTION RESERVATION AP INFORMATION

END

WIRELESS COMMUNICATION CONTROL DEVICE, WIRELESS COMMUNICATION DEVICE, AND WIRELESS COMMUNICATION CONTROL METHOD CAPABLE OF REDUCING WASTEFUL COMMUNICATION WHILE PREVENTING CONCENTRATION OF CONNECTIONS ON SAME ACCESS POINT OF WIRELESS NETWORK

CROSS REFERENCE TO RELATED APPLICATIONS

The present application is a continuation application of International Patent Application No. PCT/JP2021/033085 filed on Sep. 9, 2021, which designated the U.S. and claims the benefit of priority from Japanese Patent Application No. 2020-172814 filed on Oct. 13, 2020. The entire disclosures of all of the above applications are incorporated herein by reference.

TECHNICAL FIELD

The present disclosure relates to a wireless communication control device, a wireless communication device, and a wireless communication control method.

BACKGROUND

A technology has been known in which a wireless communication device for a vehicle is connected to a wireless network via a wireless communication with an access point of a wireless network, and transmits and receives information. A vehicle moves at high speed, while a communication range of wireless network access point is limited. Therefore, when an access spot around the vehicle is connected at random, the connection is cut off as soon as the user moves away from the access point. As a result, a difficulty that an effective wireless communication cannot be performed may occur.

SUMMARY

By a wireless communication control device, a wireless communication device, a wireless communication control method, a predicted travel route of a vehicle is identified, access point information for identifying a position of an access point and a communication range is acquired. estimation information for estimating a transit time in a section on the identified travel route is acquired, a transit time required for the vehicle to pass through a communication range of the access point connectable to the wireless communication device on the identified travel route is estimated, and the access point causing the estimated transit time to be equal to or higher than a threshold is determined.

BRIEF DESCRIPTION OF DRAWINGS

FIG. 2 is a diagram showing one example of schematic configurations of a vehicle unit 5 and a wireless communication device.

DETAILED DESCRIPTION

Figure 1:
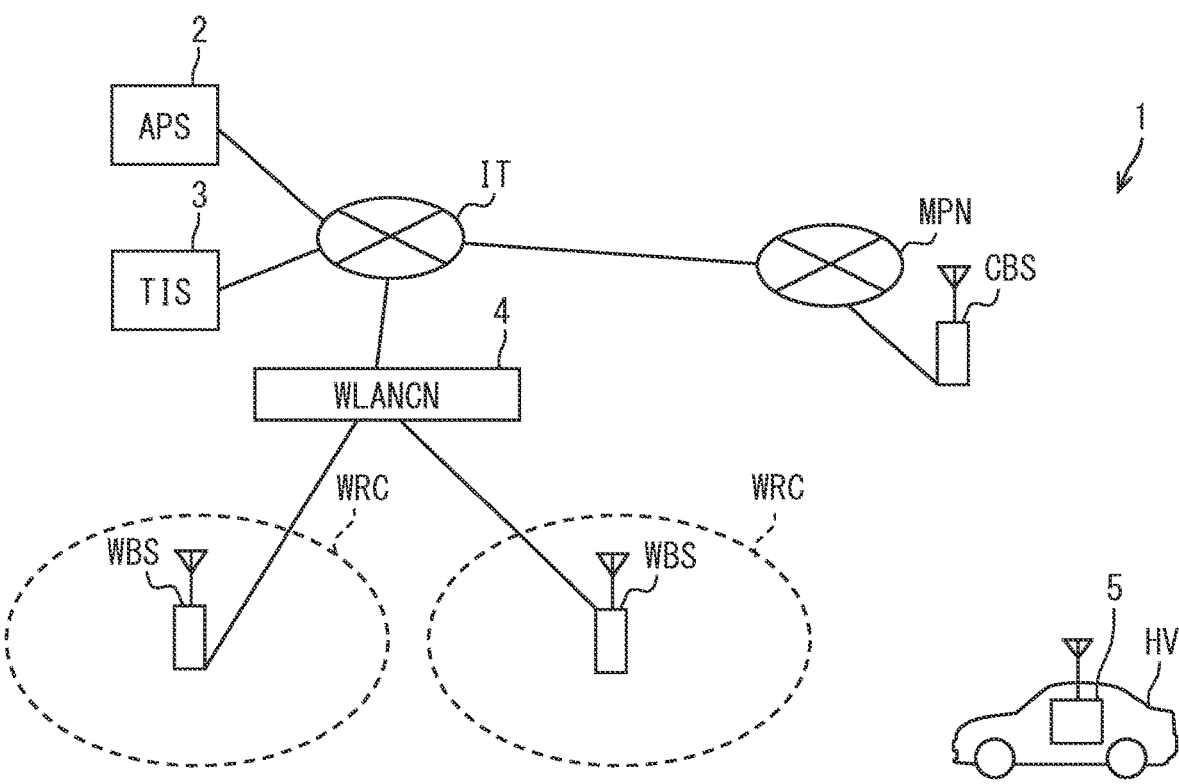
FIG. 1 is a diagram showing one example of a schematic configuration of a vehicle communication system.

For example, in a comparative technology, there are multiple wireless base stations (that is, access points) in a traveling direction of a vehicle. Further, after wireless base stations within a predetermined distance range are selected from among wireless base stations, a far wireless base station is selected as a connection destination among the wireless base stations. The technology tries to secure a longer connection time to one access point by selecting the farthest access point from the vehicle as a connection destination when there are multiple access points in the traveling direction of the vehicle.

However, with the comparative technology, for a group of vehicles traveling in the same direction, the same access point that is farthest from the group of vehicles is selected as the connection destination for all vehicles in the group of vehicles. Therefore, there is a risk that connections are concentrated on the same access point, and connection failure or throughput reduction occurs.

Further, in the comparative technology, although the access point farthest from the vehicle in the vehicle traveling direction is selected as the connection destination, a transit time of the access point communication range is not considered. Accordingly, when the transit time within the communication range of the access point is short, the connection with the access point is cut off before the communication is completed, and wasteful communication occurs.

The present disclosure provides a wireless communication control device, a wireless communication device, and a wireless communication control method capable of reducing wasteful communication while preventing concentration of connections on the same access point of a wireless network.

A wireless communication control device of the present disclosure controls a wireless communication device that is usable for a vehicle and is configured to transmit and receive information via wireless communication with an access point of a wireless network. The wireless communication control device includes: a route identification unit that identifies a predicted travel route of the vehicle; an access point information acquisition unit that acquires access point information that is information for identifying at least a position of the access point and a communication range of the access point; an estimation information acquisition unit that acquires estimation information that is information for estimating a transit time in a section on the travel route identified by the route identification unit; a transit time estimation unit that estimates a transit time required for the vehicle to pass through a communication range of a target point that is the access point connectable to the wireless communication device on the travel route identified by the route identification unit, based on the access point information acquired by the access point information acquisition unit and the estimation information acquired by the estimation information acquisition unit; and a connection destination determination unit that determines, as a connection destination of the wireless communication device, the access point that causes the transit time estimated by the transit time estimation unit to be equal to or higher than a threshold.

Further, a wireless communication control method of the present disclosure is executed by at least one processor and controls a wireless communication device that is usable for a vehicle and is configured to transmit and receive information via wireless communication with an access point of a wireless network. The method includes: a route identification process of identifying a predicted travel route of a vehicle; an access point information acquisition process of acquiring access point information that is information for identifying at least a position of the access point and a communication range of the access point; an estimation information acquisition process of acquiring estimation information that is information for estimating a transit time in a section on the travel route identified by the route identification process; a transit time estimation process of estimating a transit time required for the vehicle to pass through a communication range of a target point that is the access point connectable to the wireless communication device on the travel route identified by the route identification process, based on the access point information acquired by the access point information acquisition process and the estimation information acquired by the estimation information acquisition process; and a connection destination determination process of determining, as a connection destination of the wireless communication device, the access point that causes the transit time estimated by the transit time estimation process to be equal to or higher than a threshold.

The AP information is information for identifying at least the position of the access point of the wireless network and the communication range. The estimation information is information for estimating the transit time in the section on the predicted travel route of the vehicle. Therefore, by using the AP information and the estimation information, it is possible to estimate the transit time required for the vehicle to pass through the communication range of the target point that is the access point to which the wireless communication device can be connected on the travel route. According to the configuration described above, it is possible to set, as the connection destination, the access point capable of securing the transit time so as to complete communication while the vehicle passes through the communication range since the access point for which estimated transit time is equal to or higher than the threshold is determined as the communication destination of the wireless communication device. Accordingly, it is possible to reduce wasteful communication with the access point, which cannot complete communication while the vehicle passes through the communication range. Further, according to the configuration described above, among the access points, the access point, for which transit time estimated to be required for the vehicle to pass through the communication range on the predicted travel route of the vehicle is equal to or higher than the threshold, is determined as the connection destination of the wireless communication device. Accordingly, even in a case of the vehicle in the vehicle group in the same advancing direction, when the traveling route of the vehicle is different, a different access point is likely to be determined as the connection destination. Accordingly, it is possible to prevent concentration of connections to the same access point of the wireless network. As a result, it is possible to reduce wasteful communication while preventing concentration of connections to the same access point of the wireless network.

Further, according to the present disclosure, the wireless communication device is usable for a vehicle, and transmits and receives information via wireless communication with the access point of the wireless network. The wireless communication device includes a communication unit that wirelessly communicates with the access point and the wireless communication control device described above.

According to this, since the wireless communication control device described above is provided, it is possible to reduce wasteful communication while preventing concentration of connections to the same access point of the wireless network.

Multiple embodiments will be described with reference to the drawings. For convenience of description, among multiple embodiments, a configuration having the same function as a configuration shown in the drawing and described in the previous embodiment may be indicated by the same reference symbol, and the description thereof may be omitted. For the configuration having the same reference symbol as in the previous embodiment, detailed description may be omitted in other embodiments.

First Embodiment

<Schematic Configuration of Vehicle Communication System>

Hereinafter, a present embodiment will be described with reference to the drawings. First, a vehicle communication system 1 will be described with reference to FIG. 1. As shown in FIG. 1, the vehicle communication system 1 includes an AP information providing server (hereinafter referred to as APS) 2, a traffic information server (hereinafter referred to as TIS) 3, a wireless LAN controller (hereinafter referred to as WLANCN) 4, and a vehicle unit 5 used in a vehicle HV. It is assumed that the vehicle HV is a subject vehicle. A WBS in FIG. 1 indicates a wireless LAN base station. That is, the base station WBS corresponds to an access point of the wireless LAN. Hereinafter, an access point may be abbreviated as AP. As the wireless LAN, for example, Wi-Fi (registered trademark) is used. When the wireless LAN is Wi-Fi, the base station WBS corresponds to a Wi-Fi spot. A WRC in FIG. 1 indicates a communication range of the base station WBS. A CBS in FIG. 1 indicates a base station for cellular communication. An IT in FIG. 1 indicates the Internet. A MPN in FIG. 1 indicates a mobile phone network.

The APS 2 is a server that provides wireless LAN AP information (hereinafter referred to as AP information). The AP information includes, for example, AP position information, AP communication range information, SSID (Service Set Identifier) for identifying the AP, and profile information required when connecting to the AP. Information in the communication range of the AP may be information of the output power of the AP, for example. The APS 2 is assumed to be connected to the Internet, for example. The APS 2 may be provided by one server or multiple servers. The APS 2 may be, for example, a server on the cloud or a distributed network such as a block chain.

The TIS 3 is a server that provides traffic information. The traffic information includes, for example, traffic congestion, accident point information, and average transit time information for each section. The TIS 3 is assumed to be connected to the Internet, for example. The TIS 3 may be provided by one server or multiple servers. The TIS 3 may be, for example, a server on the cloud or a distributed network such as a block chain.

The WLANCN 4 is a controller that manages base stations WBS, which are multiple access points. This WLANCN 4 corresponds a management device. The WLANCN 4 is connected to, for example, the Internet and the multiple base stations WBS. It is assumed that the WLANCN 4 manages the number of connections of each base station WBS. The WLANCN 4 includes, for example, a processor, a memory, I/O, and a bus connecting them. The WLANCN 4 may execute various processes related to management of the number of connections of each base station WBS by executing a control program stored in the memory.

When receiving a later-described reservation notification transmitted from the vehicle unit 5, in response to this reservation notification, the WLANCN 4 prioritizes a connection between the base station WBS specified in the reservation notification and the later-described wireless communication device 50 of the vehicle unit 5. For example, the WLANCN 4 may secure an empty space in the maximum number of connections at the base station WBS specified in the reservation notification so that connection with the wireless communication device 50 that has made the reservation is possible. Alternatively, by increasing the resource allocation for the connection between the base station WBS specified in the reservation notification and this wireless communication device 50, the connection with the wireless communication device 50 that has made the reservation may be made possible.

The vehicle unit 5 transmits information to a server and receives information from the server or the like connected to a wireless LAN via the connection with the base station WBS. Details of the vehicle unit 5 will be described below.

<Schematic Configuration of Vehicle Unit>

Figure 2:
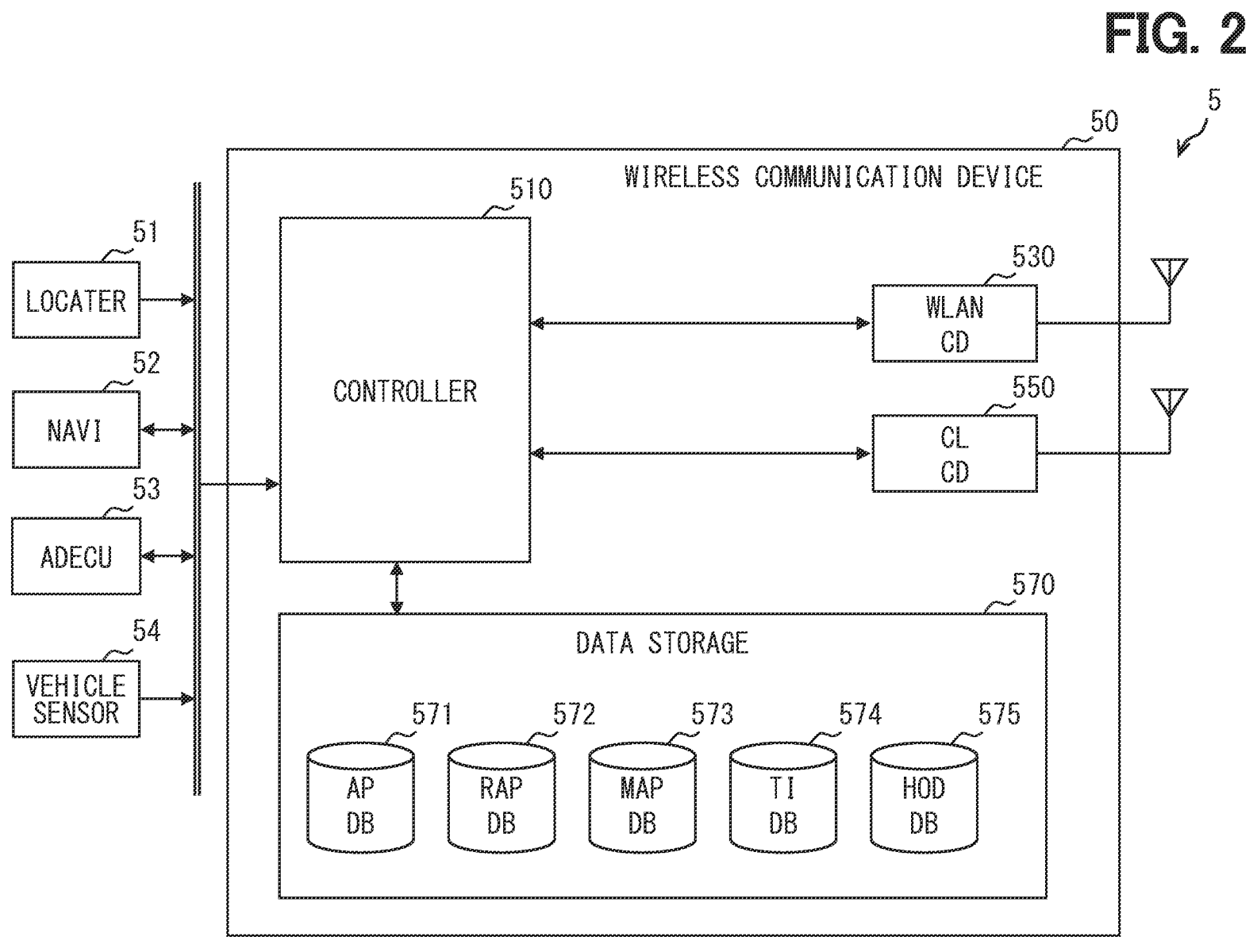

Next, a schematic configuration of the vehicle unit 5 will be described with reference to FIG. 2. As shown in FIG. 2, the vehicle unit 5 includes a wireless communication device 50, a locator 51, a navigation device (hereinafter, NAVI) 52, an automated driving ECU (hereinafter, ADECU) 53, and a vehicle sensor 54. Hereinafter, a vehicle on which the vehicle unit 5 is mounted is referred to as the subject vehicle. The wireless communication device 50, the locator 51, the NAVI 52, the ADECU 53, and the vehicle sensor 54 may be connected to each other by an in-vehicle LAN, for example.

The locator 51 includes a GNSS (Global Navigation Satellite System) receiver and an inertial sensor. The GNSS receiver receives positioning signals from multiple positioning satellites. The inertial sensor includes, for example, a gyro sensor and an acceleration sensor. The locator 51 sequentially measures a vehicle position of the subject vehicle HV by combining the positioning signals received by the GNSS receiver and the measurement results of the inertial sensor. The vehicle position may be measured based on a traveling distance obtained from detection results sequentially output from a vehicle speed sensor mounted on the subject vehicle HV.

The NAVI 52 provides route guidance to guide a user of the subject vehicle to the set destination. The destination of the subject vehicle HV may be set according to an operation input received from the user via an operation input unit, for example. As for a departure point, for example, the current position of the subject vehicle may be set as the departure point. The NAVI 52 searches a recommendation route from the departure point to the destination, and provides route guidance using the searched recommendation route. Also, the recommendation route may be re-searched (that is, rerouted) when the destination is reset or when the subject vehicle HV deviates from the recommendation route during route guidance.

The ADECU 53 recognizes a traveling environment of the subject vehicle by using the sensing result of the surrounding monitoring sensor of the subject vehicle HV. In one example, a virtual space that reproduces an actual travelling environment in three dimensions is generated. Further, the ADECU 53 determines a traveling schedule of the subject vehicle based on the recognized traveling environment. In one example, the ADECU 53 determines, as a medium- to long-term traveling schedule, a recommendation route for directing the subject vehicle HV to the destination. Further, the ADECU 53 determines, as a short-term traveling schedule, execution of steering for lane keeping and lane change, acceleration and deceleration for speed adjustment, sudden braking for collision avoidance, or the like. The ADECU 53 executes an automated driving function of acting as a driving operation by a driver, by performing traveling control of the vehicle according to the determined traveling schedule. The ADECU 53 may control traveling in cooperation with an ECU controlling the vehicle.

The vehicle sensor 54 is a sensor group for detecting various states of a subject vehicle HV. The vehicle sensor 54 includes a vehicle speed sensor for detecting a vehicle speed of the subject vehicle HV. The vehicle sensor 54 outputs the detected sensing information to the in-vehicle LAN. Note that the sensing information detected by the vehicle sensor 54 may be output to the in-vehicle LAN via the ECU mounted on the subject vehicle HV.

The wireless communication device 50 transmits and receives information via the wireless communication. The wireless communication device 50 communicates with the server or the like connected to a public communication network, via the public communication network, a base station, and the like. Examples of the public communication network include the Internet described above, the cellular phone network, and the like. Details of the wireless communication device 50 will be described below.

<Schematic Configuration of Wireless Communication Device>

Next, a schematic configuration of the wireless communication device 50 will be described with reference to FIG. 2. As shown in FIG. 2, the wireless communication device 50 includes the controller 510, a wireless LAN communication unit (hereinafter, WLAN communication unit) 530, a cellular communication unit (hereinafter, CL communication unit) 550, and a data storage 570. The WLAN communication unit 530 is indicated as WLANCD in FIG. 2. The CL communication unit 550 is indicated as CLCD in FIG. 2.

The WLAN communication unit 530 is connected to the base station WBS to perform wireless communication. The WLAN communication unit 530 communicates with a server or the like connected to the wireless LAN network via the base station WBS. This communication is hereinafter referred to as wireless LAN communication. The WLAN communication unit 530 corresponds to the communication unit. The wireless LAN communication is possible within the communication range WRC of the base station WBS.

The CL communication unit 550 communicates with the APS 2 and the TIS 3 via the cellular communication base station CBS, the mobile phone network, and the Internet. That is, the CL communication unit 550 communicates with the server 2 by connecting to a cellular network. This communication is referred to as cellular communication. The cellular communication includes communication using cellular lines such as LTE (Long Term Evolution) and 5G.

The data storage 570 stores various information. A non-volatile memory may be used as the data storage 570. The data storage 570 may be provided by one memory or multiple memories. The data storage 570 includes an access point information database (hereinafter referred to as APDB)

571, a reserved access point information database (hereinafter referred to as RAPDB) 572, a map database (hereinafter referred to as MAPDB) 573, a traffic information database (hereinafter referred to as TIDB) 574, and a traveling history database (hereinafter referred to as HODDB) 575.

The APDB 571 is a database that stores AP information acquired from the APS 2. The RAPDB 572 is a database that stores AP information of the base station WBS for which later-described connection reservation has been made. That is, it is a database that stores AP information of the reserved access point. The AP information of the reserved access point stored in the RAPDB 572 should include at least SSID.

The MAPDB 573 is a database that stores map data. The map data includes link data, node data, road shape data, and the like. The link data includes various pieces of data such as a link ID identifying a link, a link length indicating a length of the link, a link azimuth, a link travel time, link shape information (hereinafter, link shape), node coordinates (latitude/longitude) of a start point and an end point of the link, and road attributes. As one example, the link shape may include a coordinate sequence representing coordinate positions of shape interpolation points representing a shape formed of both ends of the link and a position between the both ends. The road attributes include a road name, a road type, a road width, the number of lanes, a speed regulation value, and the like. The node data includes a various piece of data such as a node ID in which a unique number is assigned to each node on a map, node coordinates, a node name, a node type, a connection link ID in which a link ID of a link connected to the node is described, and the like. The road shape data includes data such as longitudinal gradient and curvature for each link. The map data stored in the MAPDB 573 may be acquired and stored from a server or the like connected to the public communication network with use of, for example, the WLAN communication unit 530, the CL communication unit 550, or the like, or may be stored in advance.

The TIDB 574 is a database that stores traffic information acquired from the TIS 3. The HODDB 575 is a database that stores the traveling history of the subject vehicle HV. The traveling history of the subject vehicle HV may be information such as the traveling frequency, passage speed, and transit time of a link on which the subject vehicle HV has traveled in the past. The traveling history of the subject vehicle HV may be sequentially stored by a control device that is different from the wireless communication device 50 and is mounted on the subject vehicle HV. The wireless communication device 50 may sequentially store the traveling history of the subject vehicle HV.

The controller 510 includes, for example, a processor, a memory, an I/O, and a bus connecting these components, and executes various processes related to wireless communication by executing a control program stored in the memory. The memory referred to here is a non-transitory tangible storage medium, and stores programs and data that can be read by a computer. The non-transitory tangible storage medium is implemented by a semiconductor memory or the like. Details of the controller 510 will be described below.

<Schematic Configuration of Controller>

Figure 3:
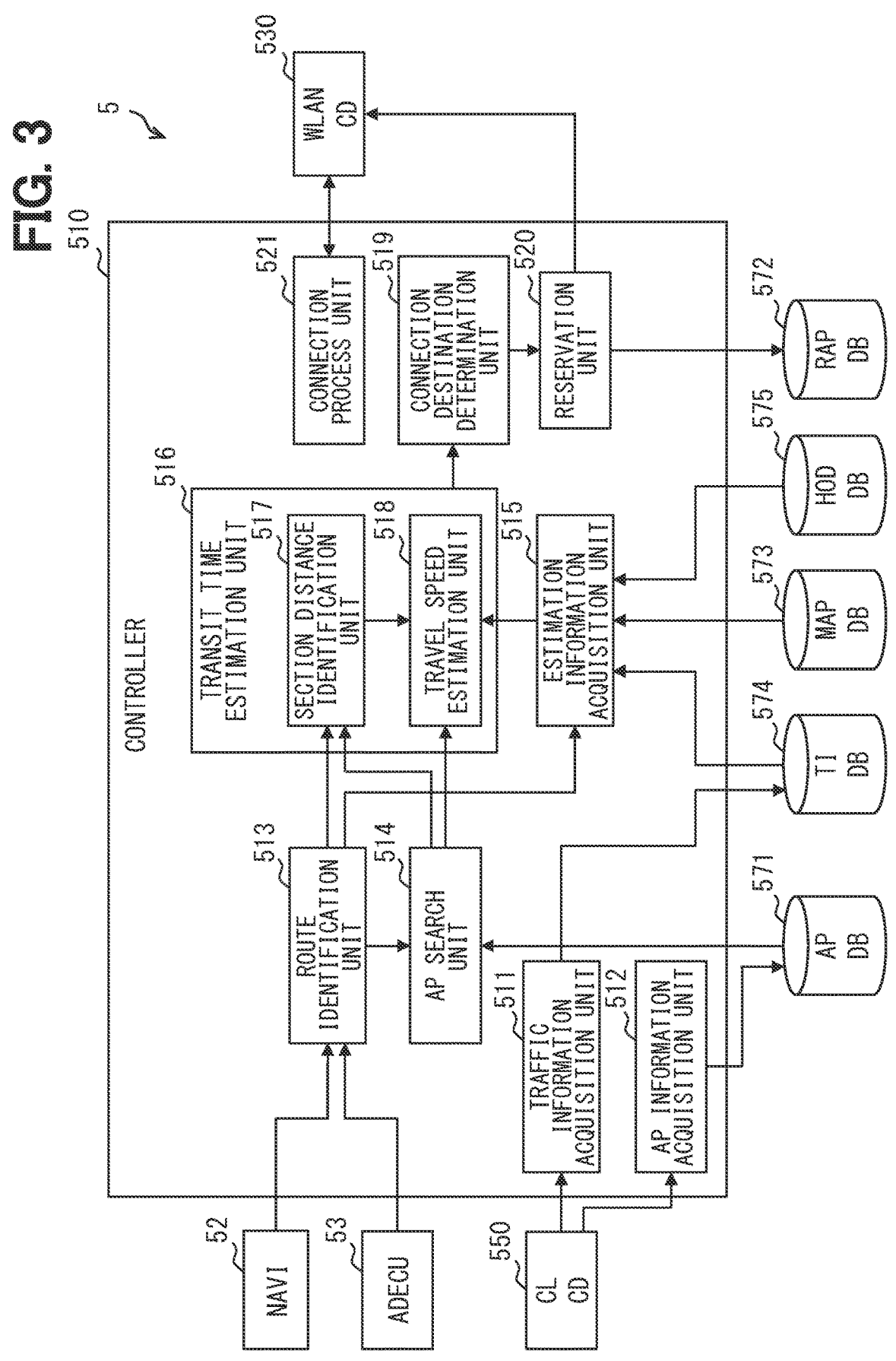
FIG. 3 is a diagram showing an example of a schematic configuration of a controller.

Next, a schematic configuration of the controller 510 will be described with reference to FIG. 3. As shown in FIG. 3, the controller 510 includes a traffic information acquisition unit 511, the AP information acquisition unit 512, a route identification unit 513, an AP search unit 514, an estimation information acquisition unit 515, a transit time estimation unit 516, and a connection destination determination unit 519, a reservation unit 520, and the connection process unit 521 as functional blocks. A part or all of the functions executed by the controller 510 may be configured in hardware by one or multiple ICs or the like. A part or all of the functional blocks included in the controller 510 may be implemented by executing software by a processor and a combination of hardware members. This controller 510 corresponds to a wireless communication control device. Execution of the process of each functional block of the controller 510 by the computer corresponds to execution of the wireless communication control method.

The traffic information acquisition unit 511 acquires traffic information from the TIS 3, and stores it in the TIDB 574. The traffic information acquisition unit 511 acquires traffic information from the TIS 3 through the cellular communication by the CL communication unit 550. In this case, the traffic information acquisition unit 511 may acquire the traffic information downloaded from the TIS 3 by the CL communication unit 550 via the Internet, the mobile phone network, and the base station CBS. Further, in order to reduce the communication load, the traffic information acquisition unit 511 may cause, for example, the CL communication unit 550 to download only traffic information within a certain range from the subject vehicle HV. In this case, the traffic information acquisition unit 511 transmits a vehicle position of the subject vehicle HV measured by the locator 51 from the CL communication unit 550 to the TIS 3, thereby causing CL communication unit 550 to download only traffic information within the certain range from the subject vehicle HV.

The traffic information acquisition unit 511 may acquire traffic information from the TIS 3 through wireless LAN communication by the WLAN communication unit 530. The timing at which the traffic information acquisition unit 511 acquires the traffic information may be regular or at a timing of detection of a predetermined trigger. For example, the traffic information acquisition unit 511 may acquire the traffic information when the wireless communication device 50 is activated.

The AP information acquisition unit 512 acquires AP information from the APS 2 and executes the AP information acquisition process to store it in the APDB 571. The process by this AP information acquisition unit 512 corresponds to an AP information acquisition process. The AP information acquisition unit 512 acquires AP information from the APS 2 through the cellular communication by the CL communication unit 550. In this case, the AP information acquisition unit 512 may acquire the AP information downloaded from the APS 2 by the CL communication unit 550 via the Internet, the mobile phone network, and the base station CBS. Further, in order to reduce the communication load, the AP information acquisition unit 512 may cause, for example, the CL communication unit 550 to download only AP information of the base station WBS within a certain range from the subject vehicle HV. In this case, the AP information acquisition unit 512 transmits a vehicle position of the subject vehicle HV measured by the locator 51 from the CL communication unit 550 to the APS 2, thereby causing CL communication unit 550 to download only AP information of the base station WBS within the certain range from the subject vehicle HV. The AP information acquisition unit 512 may acquire the AP information from the APS 2 through the wireless LAN communication by the WLAN communication unit 530. Details of the AP information acquisition process will be described later.

The route identification unit 513 identifies a predicted travel route (hereinafter referred to as prediction travel route) of the subject vehicle HV. This process by the route identification unit 513 corresponds to a route identification process. When the NAVI 52 searches for the recommendation route, the route identification unit 513 may identify the searched recommendation route as a prediction travel route. When the recommendation route is newly searched by the NAVI 52, the route identification unit 513 may newly identify the newly searched recommendation route as the prediction travel route. Further, when the subject vehicle HV travels along the recommendation route determined by the ADECU 53 by automated driving, the route identification unit 513 may identify this recommendation route as the prediction travel route. When the recommendation route is newly generated by the ADECU 53, the route identification unit 513 may newly identify the newly generated recommendation route as the prediction travel route. In addition, when neither the NAVI 52 nor the ADECU 53 is mounted on the subject vehicle HV, the route identification unit 513 identifies a route with a high travel frequency of the subject vehicle HV as the prediction travel route of the vehicle HV, based on the traveling history of the subject vehicle HV stored in the HODDB 575.

The AP search unit 514 searches the AP information of the base station WBS to which the WLAN communication unit 530 can connect on the prediction travel route identified by the route identification unit 513 from the AP information stored in the APDB 571. The AP search unit 514 determines whether the connection is possible based on a positional relationship between a range identified from the position information of the AP (that is, the base station WBS) and the communication range information in the AP information stored in the APDB 571 and a prediction travel route identified by the route identification unit 513. For example, a base station WBS whose communication range overlaps with the prediction travel route may be determined as a connectable base station WBS. The communication range is not limited to the range in which the wireless communication between the base station WBS and the WLAN communication unit 530 is possible, and may be a range in which throughput is equal to or greater than a predetermined value.

The estimation information acquisition unit 515 acquires information (hereinafter referred to as estimation information) that enables estimation of the transit time of the section on the prediction travel route identified by the route identification unit 513. The process by this estimation information acquisition unit 515 corresponds to an estimation information acquisition process. The estimation information acquisition unit 515 may acquire, as the estimation information, information that enables estimation of a transit speed (that is, travel speed) in the section on the prediction travel route. For example, the estimation information acquisition unit 515 may acquire, from the MAPDB 573, information about a road structure in map data (hereinafter referred to as road structure information) as this estimation information. Examples of road structure information acquired as information for estimation include the road width, number of lanes, longitudinal gradient, curvature, link shape, link and node data that enable determination of whether to turn right or left or go straight at an intersection.

Further, the estimation information acquisition unit 515 may acquire at least one of the traffic information or the traveling history of the subject vehicle HV as the estimation information. The estimation information acquisition unit 515 may acquire, as the traffic information, traffic information stored in the TIDB 574. The estimation information acquisition unit 515 may acquire, as the traveling history of the subject vehicle HV, the traveling history of the subject vehicle HV stored in the HODDB 575.

The transit time estimation unit 516 estimates the transit time required for the subject vehicle HV to pass though the communication range of the base station WBS (hereinafter referred to as a target point) to which the wireless communication device 50 is connectable on the prediction travel route identified by the route identification unit 513. This process by the transit time estimation unit 516 corresponds to a transit time estimation process. The transit time estimation unit 516 uses, in the AP information acquired by the AP information acquisition unit 512, AP information acquired by the AP search unit 514 and the estimation information acquired by the estimation information acquisition unit 515 to estimate this transit time. The transit time estimation unit 516 includes a section distance identification unit 517 and a travel speed estimation unit 518 as subfunctional blocks.

The section distance identification unit 517 uses the AP information searched by the AP search unit 514 to identify a distance of a section (hereinafter referred to as a target section) included in the communication range of the target point on the prediction travel route. The section distance identification unit 517 determines, as the target section, a section in the communication range identified from the position information of an AP (that is, base station WBS) of the AP information and communication range information in the prediction travel route identified by the route identification unit 513. Then, the distance of the identified target section can be identified based on link length information in the MAPDB 573. For example, for a link having a part included in the target section among the links according to the target section, the distance may be identified from the link length of this link based on the ratio of the part included in the target section in this link.

The travel speed estimation unit 518 estimates a travel speed of the subject vehicle HV using the estimation information acquired by the estimation information acquisition unit 515. In one example, the road structure information acquired by the estimation information acquisition unit 515 may be used for estimation of the travel speed of the subject vehicle HV for each link. In this case, the travel speed estimation unit 518 may estimate the travel speed of the subject vehicle HV according to the road structure based on a correspondence relationship between the road structure and the travel speed stored in a memory of the controller 510 in advance. As the correspondence relationship, a conversion table or the like for calculating the travel speed according to the road structure may be used.

An example of the correspondence relationship between the road structure and the travel speed may be set as follows. The higher the curvature of the road, the lower the travel speed. The steeper the uphill gradient, the lower the travel speed. The lower the straightness of the road, the lower the travel speed. For example, the greater the number of continuous curves with a curvature equal to or greater than a certain value, the lower the straightness. The straightness of the road can be specified from the shape of the link. When there is a right or left turn at an intersection, the travel speed should be lower than a case of straight. The smaller the road width, the lower the travel speed. The smaller the number of lanes, the lower the travel speed. According to the above configurations, it is possible to estimate the travel speed of the subject vehicle HV from the road structure information included in the map data. Accordingly, it is possible to estimate the travel speed of the subject vehicle HV without taking the trouble of acquiring traffic information and accumulating the traveling history of the subject vehicle HV.

Further, the travel speed estimation unit 518 may estimate the travel speed of the subject vehicle HV for each link using the traffic information acquired by the estimation information acquisition unit 515. For example, the travel speed of the subject vehicle HV may be estimated from the average transit time for each section in the traffic information. According to this, it becomes possible to more accurately estimate the travel speed of the subject vehicle HV. Further, the travel speed may be estimated to be lower as the congestion state in the traffic information worsens. Alternatively, based on the information of an accident location in the traffic information, the travel speed in the vicinity of the accident location may be estimated to be low.

Further, the travel speed estimation unit 518 may estimate the travel speed of the subject vehicle HV for each link using the traveling history of the subject vehicle HV acquired by the estimation information acquisition unit 515. For example, the travel speed of the subject vehicle HV may be estimated from the transit speed of the link on which the subject vehicle HV traveled in the past. According to this, it becomes possible to more accurately estimate the travel speed of the subject vehicle HV.

The travel speed estimation unit 518 may improve the accuracy of estimating the travel speed by combining two or more among the road structure information, the traffic information, and the traveling history of the subject vehicle HV. Further, the estimation of the travel speed of the subject vehicle HV by the travel speed estimation unit 518 may be performed based on only the prediction travel route identified by the route identification unit 513, or only the target section of which distance is identified by the section distance identification unit 517. It is possible to reduce the load caused by estimation of the travel speed by narrowing the target on the road on which the travel speed of the subject vehicle HV is estimated by the travel speed estimation unit 518.

The transit time estimation unit 516 may estimate the transit time required for the subject vehicle HV to pass through the communication range of the target point based on a distance of the target section identified by the section distance identification unit 517 and the travel speed in the target section among the travel speeds of the subject vehicle HV estimated by the travel speed estimation unit 518.

The connection destination determination unit 519 determines, as the connection destination of the wireless communication device 50, a base station WBS for which transit time estimated by the transit time estimation unit 516 is equal to or greater than a threshold. This process by the connection destination determination unit 519 corresponds to a connection destination determination process. The threshold referred to here is a value that can be set arbitrarily. For example, the time estimated to be required for transmission and reception of the amount of information expected to be transmitted and received may be set as the threshold value.

The reservation unit 520 transmits, to the WLANCN 4, a reservation notification for making a reservation of the connection between the wireless communication device 50 and the base station WBS determined as the connection destination for the wireless communication device 50 by the connection destination determination unit 519. This process by the reservation unit 520 corresponds to a reservation process. The reservation notification may be transmitted to the WLANCN 4 via the WLAN communication unit 530 and the base station WBS. The reservation notification may be transmitted to the WLANCN 4 via the CL communication unit 550, the base station CBS, the mobile phone network, and the Internet. The reservation unit 520 stores, in the RAPDB 572, the AP information of the base station WBS for which the connection reservation has been made, upon completing the connection reservation by notifying the WLANCN 4 of the reservation.

The notification content of the reservation notification may include information identifying the base station WBS that makes the connection reservation, and information identifying the wireless communication device 50 as its own device. One example of the information identifying the base station WBS that makes the connection reservation is the SSID of this base station WBS. One example of the information identifying the wireless communication device 50 as its own device is a MAC address of the wireless communication device 50.

Further, it is preferable that the notification content of the reservation notification includes information of a connection reservation period indicating a period for which the reservation is made. According to this, it is possible to reduce a period causing the wasteful vacancy for the connection with the base station WBS. The reservation unit 520 may estimate the connection reservation period based on the current time, the predicted travel speed of the subject vehicle HV, the prediction travel route identified by the route identification unit 513, the position of the target section identified by the section distance identification unit 517, and the transit time estimated by the transit time estimation unit 516. For example, the average vehicle speed of the subject vehicle may be used as the predicted travel speed of the subject vehicle HV. When the ADECU 53 has scheduled the travel speed of the subject vehicle HV traveling along the prediction travel route, the scheduled travel speed may be used. The start time of the connection reservation period may be set to a time obtained by subtracting a certain margin from a time when the vehicle reaches the start point of the target section after traveling along the prediction travel route at the prediction travel speed from the current time. The end time of the connection reservation period may be set to a time obtained by adding the transit time and a certain margin to the start time of the connection reservation period.

Upon receiving the reservation notification, the WLANCN 4 prioritizes the connection between the base station WBS and the wireless communication device 50 specified in the reservation notification, as described above. In a more detailed example, the WLANCN 4 prioritizes the connection between the base station WBS identified by the SSID in the reservation notification and the wireless communication device 50 identified by the MAC address in the reservation notification. When the reservation notification includes a connection reservation period, the WLANCN 4 may prioritize the connection between the wireless communication device 50 and the base station WBS specified in the reservation notification during this connection reservation period. For example, during this connection reservation period, a vacancy of the connection number may be set, and the vacancy may be allocated to the connection between the base station WBS and the wireless communication device 50 specified in the reservation notification.

The connection process unit 521 executes the connection process for preferentially connecting to the base station WBS for which the reservation for connection has been made by the reservation unit 520 to transmit and receive information. Details of the connection process will be described later.

<AP Information Acquisition Process>

Figure 4:
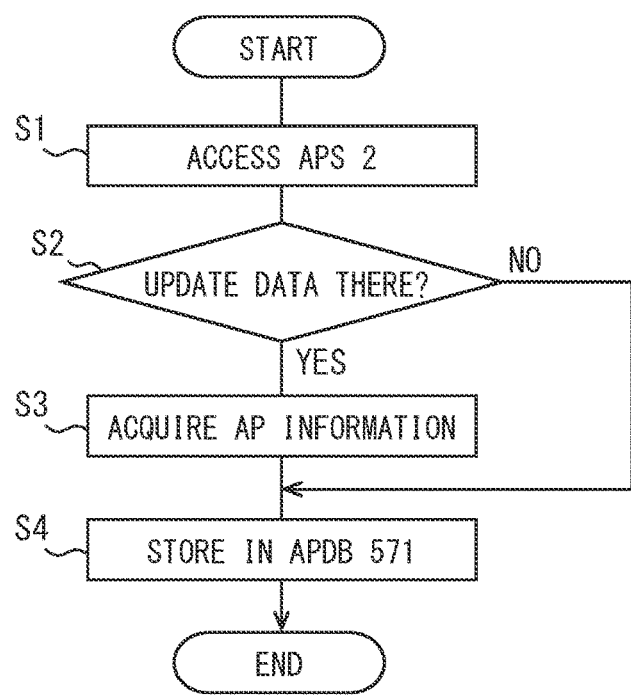
FIG. 4 is a flowchart showing one example of a flow of an AP information acquisition process by an AP information acquisition unit.

Next, one example of the flow of the AP information acquisition process by the AP information acquisition unit 512 will be described with reference to a flowchart of FIG. 4. The flowchart of FIG. 4 may start when, for example, a switch (hereinafter referred to as a power switch) for starting an internal combustion engine or a motor generator of the subject vehicle HV is turned on and the wireless communication device 50 is activated. The AP information acquisition process may start at a timing when the wireless communication device 50 is activated and at a timing that meets a predetermined condition, for example, once every few days.

First, in S1, for example, the APS 2 is accessed via the CL communication unit 550 to inquire about the presence or absence of update data. The update data corresponds to update data of the acquired AP information when the AP information has already been acquired. When the AP information has not been acquired, the update data corresponds to newly acquired AP information. In S2, when there is update data (YES in S2), the process proceeds to S3. On the other hand, when there is no update data (NO in S2), the AP information acquisition process ends.

In S3, AP information is acquired from the APS 2 via the CL communication unit 550. In S3, only AP information corresponding to the update may be obtained. In S4, the AP information acquired in S3 is stored in the APDB 571, and the AP information AP information acquisition process ends.

<Connection Reservation-Related Process>

Figure 5:
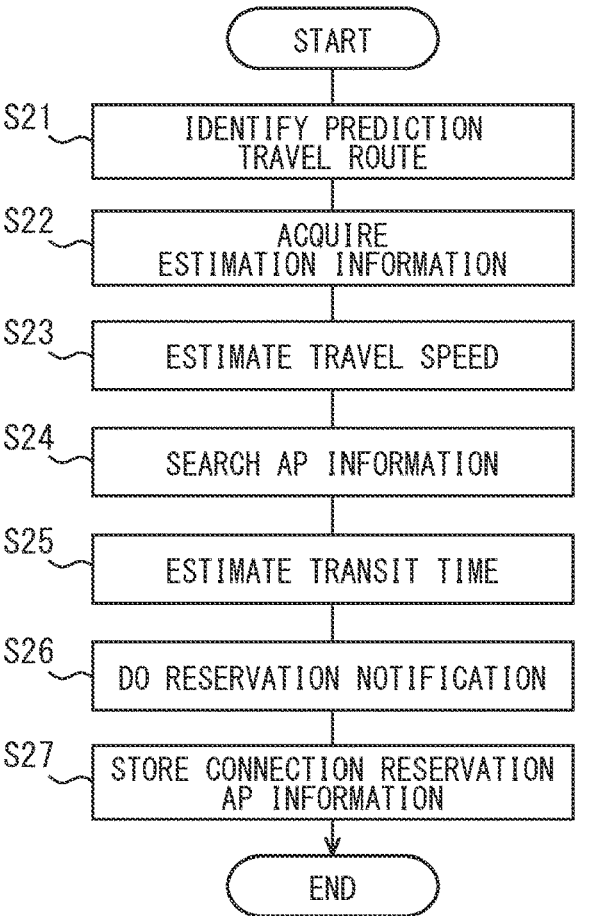
FIG. 5 is a flowchart showing one example of a flow of a connection reservation-related process by the controller.

Next, an example of a flow of a process related to the connection reservation of the base station WBS in the controller 510 (hereinafter referred to as connection reservation-related process) will be described with reference to a flowchart of FIG. 5. The flowchart of FIG. 5 may start when a destination is set by the NAVI 52 and the recommendation route is searched, or when reroute is performed by the NAVI 52. Further, the flowchart may start when the recommendation route is searched by the ADECU 53. Furthermore, the flowchart may start when the power switch of the subject vehicle HV may be turned on and the wireless communication device 50 is activated.

In S21, the route identification unit 513 identifies the prediction travel route. In a case where the connection reservation-related process starts when a destination is set by the NAVI 52 and the recommendation route is searched or when the reroute is performed by the NAVI 52, the route identification unit 513 selects the recommendation route searched by the NAVI 52 as the prediction travel route. In a case where the connection reservation-related process starts when the ADECU 53 searches for a recommendation route, the route identification unit 513 may identify the recommendation route determined by the ADECU 53 as the prediction travel route. In a case where the power switch of the subject vehicle HV is turned on and the connection reservation-related process starts, the route identification unit 513 may identify the prediction travel route based on the traveling history of the subject vehicle HV, the history being stored in the HODDB 575, when the NAVI 52 and the ADECU 53 are not mounted on the subject vehicle HV. Even when the power switch of the subject vehicle HV is turned on and the connection reservation-related process starts, the route identification unit 513 may identify, as the prediction travel route, the recommendation route searched by the NAVI 52, or the recommendation route determined by the ADECU 53.

In S22, the estimation information acquisition unit 515 acquires estimation information enabling estimation of the transit time of the section on the prediction travel route identified in S21. In S23, the travel speed estimation unit 518 estimates the travel speed of the subject vehicle HV using the estimation information acquired in S22. In S23, a travel speed of the subject vehicle HV only in the section on the prediction travel route identified in S21 may be estimated.

In S24, the AP search unit 514 searches AP information of the base station WBS that is connectable to the WLAN communication unit 530 on the prediction travel route identified in S21 among AP information stored in the APDB 571. In S25, the transit time estimation unit 516 estimates the transit time required for the transit of the subject vehicle HV in the communication range of the base station WBS connectable to the wireless communication device 50 on the prediction travel route identified in S21, with use of the estimation information acquired in S22 and the AP information searched in S24.

In S26, the connection destination determination unit 519 determines, as the connection destination for the wireless communication device 50, the base station WBS for which transit time estimated in S25 is equal to or greater than the threshold. In S27, the reservation unit 520 transmits, to the WLANCN 4, a reservation notification for making a reservation of the connection between the wireless communication device 50 and the base station WBS determined as the connection destination for the wireless communication device 50 in S26. In S28, the reservation unit 520 stores, in the RAPDB 572, the AP information of the base station WBS for which connection reservation was made in S27, and the connection reservation-related process ends.

When the prediction travel route is newly identified and the connection destination determined by the connection destination determination unit 519 is changed, the reservation unit 520 may notify the WLANCN 4 of canceling the changed connection reservation. The WLANCN 4 that has received this notification may cancel the connection reservation for which the cancellation has been notified.

<Connection Process>

Figure 6:
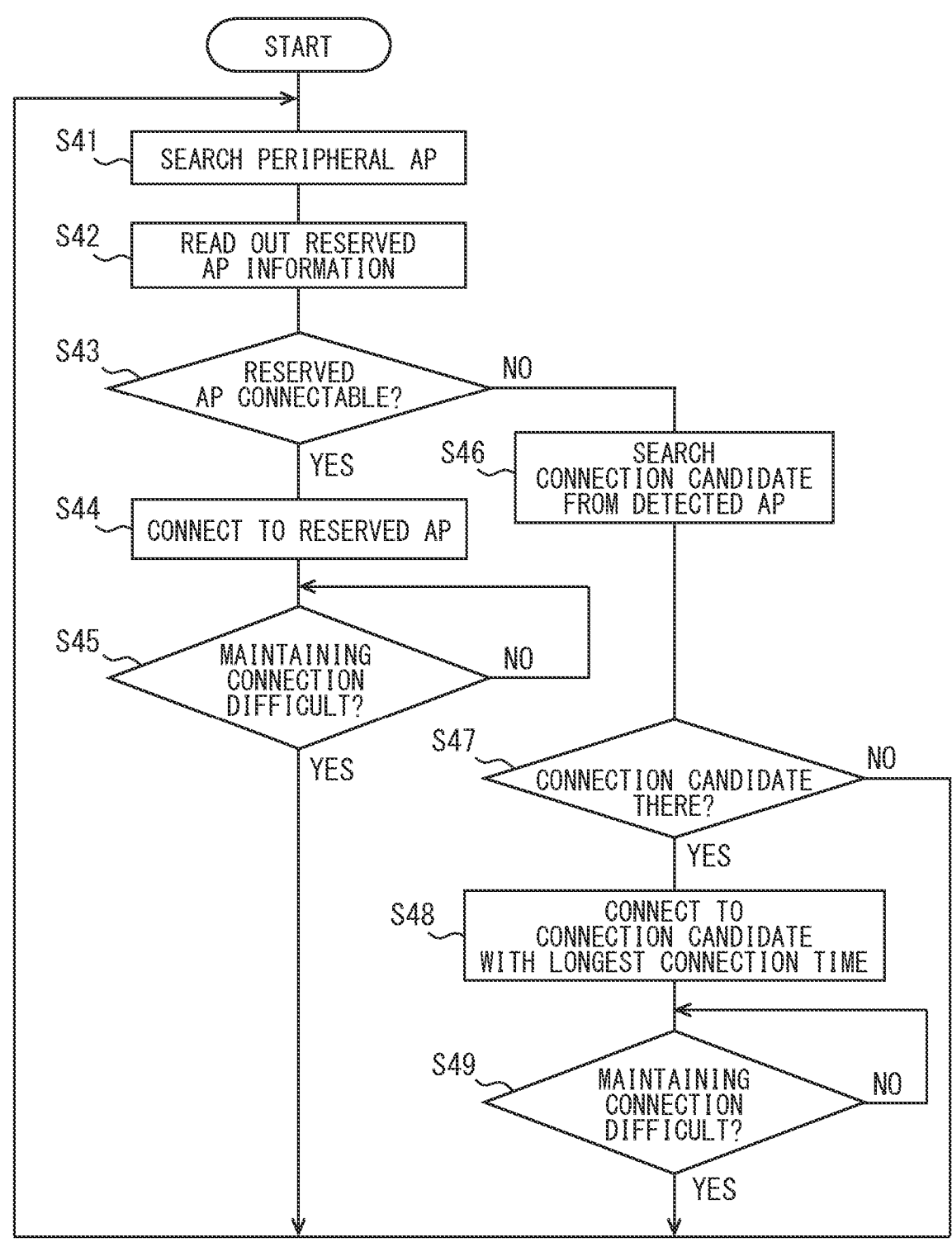
FIG. 6 is a flowchart showing one example of a flow of a connection process by a connection process unit.

Next, one example of the flow of connection process by the connection process unit 521 will be described with reference to the flowchart of FIG. 6. The flowchart in FIG. 6 may start at regular intervals when, for example, the power switch of the subject vehicle HV is turned on and the connection reservation is made in the connection reservation-related process. The end timing of the connection process may be, for example, a timing when the power switch of the subject vehicle HV is turned off or the like.

First, in S41, the WLAN communication unit 530 is caused to search for base station WBSs (that is, peripheral APs) around the subject vehicle HV. The search may be performed by detecting the SSID of the base station WBS from the signal received by the WLAN communication unit 530. In S42, the AP information of the base station WBS for which connection has been reserved is read from the RAPDB 572.

In S43, based on the AP information read in S42 and the SSID detected in S41, it is detected whether the base station WBS for which connection has been reserved exists among the base station WBSs around the searched subject vehicle HV. Then, when the base station WBS for which connection has been reserved is detected, it is determined that the reserved AP connection is possible (YES in S43), and the process proceeds to S44. On the other hand, when the base station WBS for which connection has been reserved is not detected, it is determined that the reserved AP connection is not possible (NO in S43), and the process proceeds to S46.

In S44, the WLAN communication unit 530 is caused to connect to the detected base station WBS for which connection has been reserved. In S45, when the subject vehicle HV moves away from the base station WBS connected in S44 and it becomes difficult to maintain the connection (YES in S45), the connection is released and the process returns to S41, and the processes are repeated. On the other hand, when it does not become difficult to maintain the connection (NO in S45), the process in S45 is repeated. The connection with the base station WBS connected in S44 may be released when transmission or reception of the required information is completed even before it becomes difficult to maintain the connection.

In S46, a connection candidate is searched from among the base stations WBS that are detected in S41 and have not been reserved for the connection. That is, the connection candidate is searched from the detected APs. The base station WBS detected in S41 refers to the base station WBS whose SSID is detected in S41. In the connection candidate search, a base station WBS estimated to be able to secure a connection time equal to or higher than a predetermined time may be searched. The predetermined time may be set longer as the amount of information required to be transmitted or received increases, for example. The predetermined time may be set to a time so that transmission or reception of the information required to be transmitted or received is completed. The connection time may be estimated in the same way as the transit time estimation unit 516 estimates the transit time. As the travel speed of the subject vehicle HV, the current vehicle speed detected by a vehicle speed sensor among the vehicle sensors 54 may be used.

In S47, when the connection candidate could be extracted as a result of the search in S46 (YES in S47), the process proceeds to S48. On the other hand, when the connection candidate could not be extracted (NO in S47), the process returns to S41 and processes are repeated. In S48, the WLAN communication unit 530 is caused to connect to a base station WBS with the longest estimated connection time among the connection candidates extracted in the search in S46.

In S49, when the subject vehicle HV moved away from the base station WBS connected in S48 and it became difficult to maintain the connection (YES in S49), the connection is released and the process returns to S41, and the processes are repeated. On the other hand, when it does not become difficult to maintain the connection (NO in S49), the process in S49 is repeated. The connection with the base station WBS connected in S48 may be released when transmission or reception of the required information is completed even before it becomes difficult to maintain the connection.

(Overview of First Embodiment)

According to the configuration of the first embodiment, by using the AP information and the estimation information, it is possible to estimate the transit time required for the vehicle to pass through the communication range of the base station WBS to which the wireless communication device 50 can be connected on the travel route. Further, it is possible to set, as the connection destination, the base station WBS capable of securing the transit time so as to complete communication while the subject vehicle HV passes through the communication range since the base station WBS for which estimated transit time is equal to or higher than the threshold is determined as the communication destination of the wireless communication device. Accordingly, it is possible to reduce wasteful communication with the base station WBS, which cannot complete communication while the subject vehicle HV passes through the communication range. Further, according to the configuration of the first embodiment, among the base station WBSs connectable to the wireless communication device 50 on the prediction travel route of the subject vehicle HV, the base station WBS for which transit time described above is equal to or higher than the threshold is determined as the connection destination of the wireless communication device 50. Accordingly, even in a case of the vehicle in the vehicle group in the same advancing direction, when the traveling route of the vehicle is different, a different base station WBS is likely to be determined as the connection destination. Hence, it is possible to prevent connections from concentrating on the same base station WBS of the wireless LAN. As a result, it is possible to reduce wasteful communication while preventing concentration of connections to the same access point of the wireless network.

Figure 7:
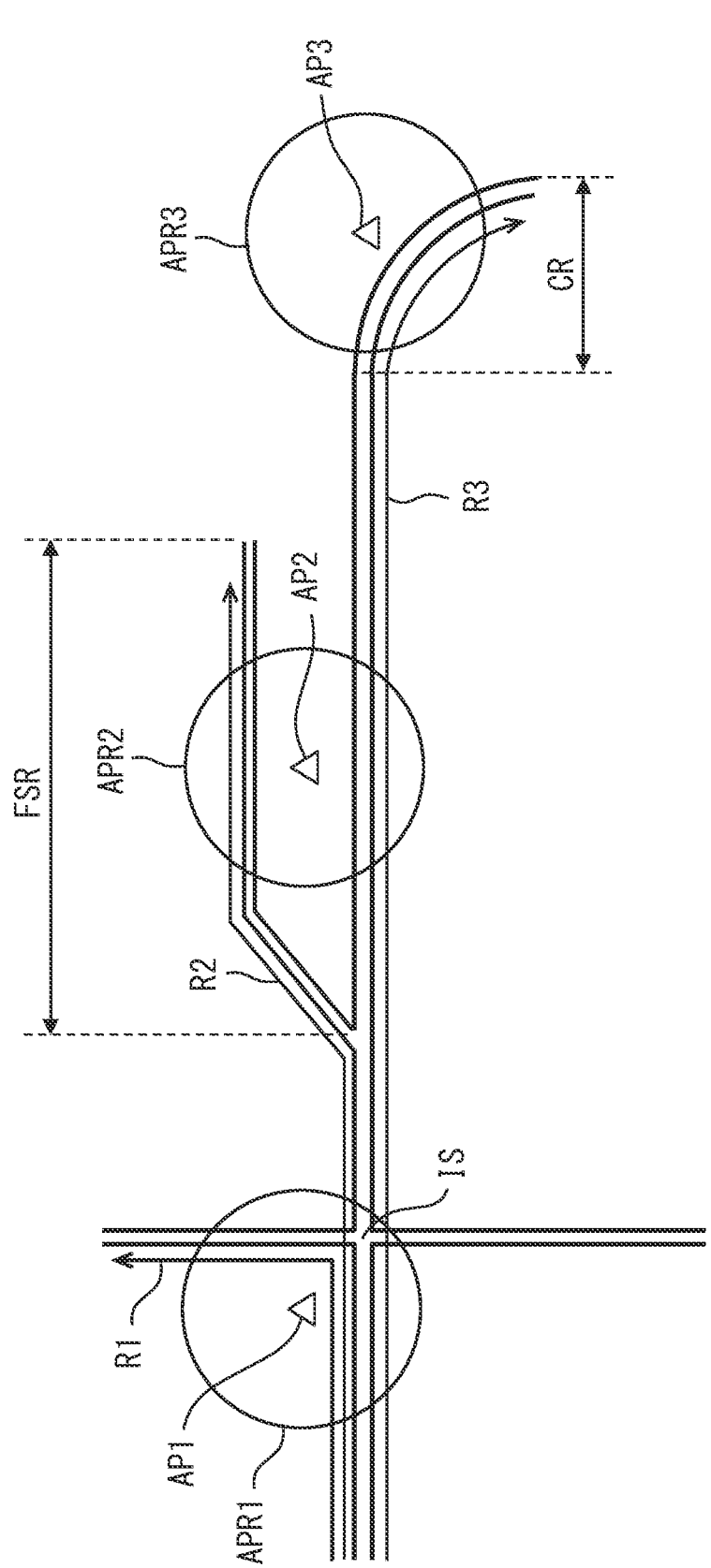
FIG. 7 is a diagram showing one example of an effect provided by a configuration according to a first embodiment.

Here, one example of the effect by the configuration of the first embodiment will be described with reference to FIG. 7. An AP1, AP2, and AP3 in FIG. 7 respectively indicate different base stations WBS. In FIG. 7, an APR1 indicates the communication range of the AP1, an APR2 indicates the communication range of the AP2, and an APR3 indicates the communication range of the AP3. In FIG. 7, a R1 indicates the first travel route, a R2 indicates the second travel route, and a R3 indicates the third travel route. An IS in FIG. 7 indicates an intersection. A FSR in FIG. 7 indicates a narrow road. A CR in FIG. 7 indicates a curved road.

Among the travel routes, only the first travel route R1 turns right or left at the intersection IS. Among the travel routes, only the second travel route passes through the narrow road FSR. Among the travel routes, only the third travel route passes through the curved road CR. The first travel route R1 is a travel route passing through a communication range APR1. The second travel route R2 is a travel route passing through communication ranges APR1 and APR2. The third travel route R3 is a travel route passing through communication ranges APR1, APR2, and APR3.

Since the communication range APR1 is the only communication range through which the first travel route R1 passes, it is assumed that the AP1 is determined as the connection destination. In the second travel route R2, the communication ranges to be passed are the communication range APR1 and the communication range APR2. Since the travel speed on the narrow road is slow and the transit time in the communication range APR2 is long, the communication destination is determined as the AP2. In the third travel route R3, the passed communication ranges are the communication range APR1, the communication range APR2, and the communication range APR3. Since the travel speed on the curved road CR is slow and the transit time in the communication range APR3 is the longest, the communication destination is determined as the AP3.

As described above, the different base station WBS is determined as the connection destination depending on the travel route of the vehicle. Hence, it is possible to prevent connections from concentrating on the same base station WBS of the wireless LAN. Further, since the base station WBS, which ensures the long transit time in the communication range, is determined as the connection destination, it is possible to reduce the wasteful communication for which connection destination is the base station WBS that cannot complete the communication while the vehicle passes through the communication range.

Although the first embodiment shows the configuration in which the reservation unit 520 makes the connection reservation of the connection destination determined by the connection destination determination unit 519, the present disclosure is not limited to this. For example, the reservation unit 520 may not be included, and the connection reservation may not be performed. It is preferable to make the connection reservation since it is possible to more reliably connect to the connection destination determined by the connection destination determination unit 519 by making the connection reservation of the connection destination.

Second Embodiment

The first embodiment shows the configuration in which the estimation information acquisition unit 515 acquires, as the estimation information, the information enabling the estimation of the travel speed in the section on the prediction travel route of the subject vehicle HV, and the travel speed estimation unit 518 estimates the travel speed of the subject vehicle HV using this information. However, the present disclosure is not limited to this configuration. For example, the transit time estimation unit 516 may estimate the transit time without estimation of the travel speed of the subject vehicle HV. In one example, the following configuration may be adapted.

The estimation information acquisition unit 515 may acquire the average transit time for each section in the traffic information as the estimation information. Alternatively, as the estimation information, an average transit time of the subject vehicle HV for each link in the traveling history of the subject vehicle HV may be acquired. Then, the transit time estimation unit 516 may estimate the transit time of the target section identified by the section distance identification unit 517 using the average transit times acquired as the estimation information.

Third Embodiment

In the first embodiment, it is described that the access point of the wireless LAN is exemplified as the access point that estimates the transit time of the communication range and makes the connection reservation. However, the present disclosure is not limited to the example. For example, an access point of the wireless network with a relatively narrow communication range can be suitably used. In one example, a connection with an access point of a 5G wireless network is suitably used.

It should be noted that the present disclosure is not limited to the embodiments described above, and various modifications are possible within the scope indicated in the claims, and embodiments obtained by appropriately combining technical means disclosed in different embodiments are also included in the technical scope of the present disclosure. The controller and the method thereof described in the present disclosure may be implemented by a special purpose computer which includes a processor programmed to execute one or more functions executed by a computer program. Alternatively, the device and the method thereof described in the present disclosure may be implemented by a special purpose hardware logic circuit. Alternatively, the device and the method thereof described in the present disclosure may be implemented by one or more special purpose computers configured by a combination of a processor executing a computer program and one or more hardware logic circuits. The computer program may also be stored in a computer-readable non-transitory tangible storage medium as instructions to be executed by a computer.

Here, the process of the flowchart or the flowchart described in this application includes a plurality of sections (or steps), and each section is expressed as, for example, S1. Further, each section may be divided into several subsections, while several sections may be combined into one section. Furthermore, each section thus configured may be referred to as a device, module, or means.

The invention claimed is:

1. A wireless communication control device configured to control a wireless communication device that is usable for a vehicle and is configured to transmit and receive information via wireless communication with an access point of a wireless network, the wireless communication control device comprising:

at least one of (i) a circuit and (ii) a processor with a memory storing computer program code executable by the processor, the at least one of the circuit and the processor configured to cause the wireless communication control device to serve as:

a route identification unit configured to identify a predicted travel route of the vehicle;

an access point information acquisition unit configured to acquire access point information that is information for identifying at least a position of the access point and a communication range of the access point;

an estimation information acquisition unit configured to acquire estimation information that is information for estimating a transit time in a section on the travel route identified by the route identification unit;

a transit time estimation unit configured to estimate a transit time required for the vehicle to pass through a communication range of a target point that is the access point connectable to the wireless communication device on the travel route identified by the route identification unit, based on the access point information acquired by the access point information acquisition unit and the estimation information acquired by the estimation information acquisition unit;

a connection destination determination unit configured to determine, as a connection destination of the wireless communication device, the access point that causes the transit time estimated by the transit time estimation unit to be equal to or higher than a threshold; and a reservation unit configured to provide a reservation notification to a management device configured to manage a plurality of access points including the access point, the reservation notification being notification for making a reservation of connection between the wireless communication device and the access point determined by the connection destination determination unit, as the connection destination of the wireless communication device.

2. The wireless communication control device according to claim 1, wherein the estimation information acquisition unit is configured to acquire, as the estimation information, information for estimating a transit speed in a section on the travel route of the vehicle, the wireless communication control device further includes a section distance identification unit configured to identify a distance of a target section that is a section in a communication range of the target point in the travel route, based on the access point information acquired by the access point information acquisition unit and a travel speed estimation unit configured to estimate a travel speed of the vehicle based on the information that is acquired by the estimation information acquisition unit and is used for estimating a travel speed of the vehicle, and the transit time estimation unit is further configured to estimate the transit time required for the vehicle to pass through the communication range of the target point based on the distance of the target section identified by the section distance identification unit and the travel speed of the vehicle estimated by the travel speed estimation unit.

3. The wireless communication control device according to claim 2, wherein the information that is acquired by the estimation information acquisition unit and used for estimating the travel speed of the vehicle is information indicating a road structure of map data, and the travel speed estimation unit is configured to estimate the travel speed of the vehicle in the target section based on the access point information acquired by the access point information acquisition unit and the information that is acquired by the estimation information acquisition unit and indicates the road structure.

4. The wireless communication control device according to claim 2, wherein the information that is acquired by the estimation information acquisition unit and is used for estimating a travel speed of the vehicle is at least one of traffic information or a traveling history of the vehicle, and the travel speed estimation unit is configured to estimate the transit speed of the vehicle in the target section based on the access point information acquired by the access point information acquisition unit and at least one of the traveling history of the vehicle or the traffic information acquired by the estimation information acquisition unit.

5. The wireless communication control device according to claim 2, wherein the section distance identification unit and the travel speed estimation unit correspond to a processor.

6. The wireless communication control device according to claim 1, wherein when the reservation unit provides the reservation notification, a notification content of the reservation notification includes information indicating a period of the made reservation of the connection.

7. The wireless communication control device according to claim 1, wherein the route identification unit, the access point information acquisition unit, the estimation information acquisition unit, the transit time estimation unit, the connection destination determination unit correspond to a processor.

8. A wireless communication device that is usable for a vehicle and is configured to transmit and receive information via wireless communication with an access point of a wireless network, the wireless communication device comprising:

at least one of (i) a circuit and (ii) a processor with a memory storing computer program code executable by the processor, the at least one of the circuit and the processor configured to cause the wireless communication device to serve as a communication unit configured to perform the wireless communication with the access point; and a wireless communication control device that includes:

a route identification unit configured to identify a predicted travel route of the vehicle;

an access point information acquisition unit configured to acquire access point information that is information for identifying at least a position of the access point and a communication range of the access point;

an estimation information acquisition unit configured to acquire estimation information that is information for estimating a transit time in a section on the travel route identified by the route identification unit;

a transit time estimation unit configured to estimate a transit time required for the vehicle to pass through a communication range of a target point that is the access point connectable to the wireless communication device on the travel route identified by the route identification unit, based on the access point information acquired by the access point information acquisition unit and the estimation information acquired by the estimation information acquisition unit;

a connection destination determination unit configured to determine, as a connection destination of the wireless communication device, the access point that causes the transit time estimated by the transit time estimation unit to be equal to or higher than a threshold; and a reservation unit configured to provide a reservation notification to a management device configured to manage a plurality of access points including the access point, the reservation notification being notification for making a reservation of connection between the wireless communication device and the access point determined by the connection destination determination unit, as the connection destination of the wireless communication device.

9. The wireless communication control device according to claim 8, wherein the communication unit corresponds to a first processor, and the route identification unit, the access point information acquisition unit, the estimation information acquisition unit, the transit time estimation unit, the connection destination determination unit correspond to a second processor.

10. A wireless communication control method that is executed by at least one processor and controls a wireless communication device that is usable for a vehicle and is configured to transmit and receive information via wireless communication with an access point of a wireless network, the method comprising:

identifying a predicted travel route of a vehicle;

acquiring access point information that is information for identifying at least a position of the access point and a communication range of the access point;

acquiring estimation information that is information for estimating a transit time in a section on the identified travel route;

estimating a transit time required for the vehicle to pass through a communication range of a target point that is the access point connectable to the wireless communication device on the identified travel route, based on the acquired access point information and the acquired estimation information;

determining, as a connection destination of the wireless communication device, the access point that causes the estimated transit time to be equal to or higher than a threshold; and providing a reservation notification to a management device configured to manage a plurality of access points including the access point, the reservation notification being notification for making a reservation of connection between the wireless communication device and the determined access point, as the connection destination of the wireless communication device.

\* \* \* \* \*